United States Patent
Ho et al.

(10) Patent No.: US 6,831,771 B2
(45) Date of Patent: Dec. 14, 2004

(54) ELECTRONIC WHITEBOARD USING ELECTROPHORETIC DISPLAY

(75) Inventors: Ching-Shon Ho, Palo Alto, CA (US); Jerry Chung, Mountain View, CA (US); Paul Gendler, San Jose, CA (US); Rong-Chang Liang, Cupertino, CA (US)

(73) Assignee: SiPix Imaging Inc., Milpitas, CA (US)

( * ) Notice: Subject to any disclaimer, the term of this patent is extended or adjusted under 35 U.S.C. 154(b) by 3 days.

(21) Appl. No.: 10/338,142

(22) Filed: Jan. 8, 2003

(65) Prior Publication Data

US 2004/0130776 A1 Jul. 8, 2004

(51) Int. Cl.[7] .......................... G02B 26/00; G09G 3/34
(52) U.S. Cl. ...................... 359/296; 345/107; 345/105
(58) Field of Search .................................. 359/296, 290; 430/35, 19, 38, 60; 345/107, 105, 108; 252/72

(56) References Cited

U.S. PATENT DOCUMENTS

| | | | |
|---|---|---|---|
| 3,668,106 A | 6/1972 | Ota | 358/305 |
| 4,071,430 A | 1/1978 | Liebert | 359/241 |
| 4,093,534 A | 6/1978 | Carter et al. | 359/296 |
| 4,285,801 A | 8/1981 | Chiang | 252/570 |
| 4,552,928 A | 11/1985 | Bauld et al. | 525/326.2 |
| 4,594,400 A | 6/1986 | Kvita et al. | 526/259 |
| 4,631,328 A | 12/1986 | Ringsdorg et al. | 526/259 |
| 4,680,103 A | 7/1987 | Beilin Solomon I | 359/296 |
| 4,769,443 A | 9/1988 | Cantatore | 428/423 |
| 5,380,362 A | 1/1995 | Schubert | 106/493 |
| 5,403,518 A | 4/1995 | Schubert | 252/572 |
| 5,573,711 A | 11/1996 | Hou et al. | 252/572 |
| 5,914,806 A | 6/1999 | Gordon II | 359/296 |
| 5,930,026 A | 7/1999 | Jacobson et al. | 359/296 |
| 5,961,804 A | 10/1999 | Jacobson et al. | 204/606 |
| 6,017,584 A | 1/2000 | Albert et al. | 427/213 |
| 6,099,630 A | 8/2000 | Soyama et al. | 106/31.64 |
| 2002/0075556 A1 * | 6/2002 | Liang et al. | 359/296 |
| 2002/0126249 A1 * | 9/2002 | Liang et al. | 349/187 |
| 2002/0182544 A1 * | 12/2002 | Chan-Park et al. | 430/311 |
| 2002/0196217 A1 | 12/2002 | Kanno | |
| 2003/0007238 A1 * | 1/2003 | Liang et al. | 359/296 |

FOREIGN PATENT DOCUMENTS

| | | | |
|---|---|---|---|
| EP | 1 107 043 A | 6/2001 | |
| WO | WO 01/067170 | 9/2001 | G02F/1/167 |
| WO | WO 02/093245 A | 11/2002 | |
| WO | PCT/US04/0610 | 6/2004 | |

OTHER PUBLICATIONS

U.S. Appl. No. 10/394,488, Ho et al., filed Mar. 20, 2003.
U.S. Appl. No. 10/421,217, Chung et al., filed Apr. 22, 2003.
Kondo, Microcapsule Processing and Technology, edited and revised by J. Wade Van Valkenburg, Marcel Dekker, Inc., New York (1979).
Microencapsulation, Processes and Applications (J. E. Vandegaer, ed.), Plenum Press, New York, New York (1974).
Gutcho, Microcapsules and Microencapsulation Techniques, Nuyes Data Corp., Park Ridge, New Jersey (1976).

(List continued on next page.)

*Primary Examiner*—Scott J. Sugarman
*Assistant Examiner*—M. Hasan
(74) *Attorney, Agent, or Firm*—Howrey Simon Arnold & White

(57) ABSTRACT

The present invention is directed to a display device which includes an array of sealed microcups containing particles of a designated electric and magnetic characteristic suspended in a solvent wherein a surface of a plurality of the sealed microcups constituting a transparent surface. The display device further includes an electromagnetic image writing/drawing pen for manually applying an electromagnetic field on the particles of the designated electric and magnetic characteristic in the microcups to form an image viewable from the transparent surface. More particularly, the particles of the designated electric and magnetic characteristic are charged particles and the writing and drawing pen is an electrical writing/drawing pen.

39 Claims, 7 Drawing Sheets

OTHER PUBLICATIONS

Marvin Camras, "Magnetic Recording Handbook", Van Nostrand Reinhold Co. (1988).

M. Kamachi, "Magnetic Polymers", pp–147–171.

"Functional Monomers and Polymers", edited by K. Takemoto, R. M. Ottenbrite and M. Kamachi, Marcel Dekker, Inc. (1997).

Dalisa, A. "Electrophoretic Display Technology", IEEE Trans. Electron Devices, ED–24, pp–827–834 (1977).

Murau P. and Singer B, J. Appl. Phys., 49(9), pp–4820–4829 (1978).

Liang, R.C et al., "Microcup Electrophoretic Displays by Roll–to–Roll Manufacturing Processes" *Proc. of the IDW'02*, International Conference Center Hiroshima (2002).

Hopper, M., et al. "An Electrophoretic Display, Its Properties, Model and Addressing" *IEEE Trans. Electr.* Dev. 26(8):1148–1152 (1979).

U.S. Appl. No. 09/518,488 filed on Mar. 3, 2000 (reference available on request).

U.S. Appl. No. 09/606,654 filed on Jun. 28, 2000 (reference available on request).

U.S. Appl. No. 09/784,972 filed on Feb. 15, 2001 (reference available on request).

U.S. Appl. No. 09/759,212 filed on Jan. 11, 2001 (reference available on request).

* cited by examiner

ELECTRONIC WHITEBOARD USING ELECTROPHORETIC DISPLAY

BACKGROUND OF THE INVENTION

1. Field of the Invention

This invention relates generally to electronic whiteboard for illustration display and for capturing contents of discussion writing or drawing on the surface of the board as digital data. More particularly, this invention is related to new and improved electronic whiteboards formed with electrophoretic cell array for receiving display inputs from both manual operations with electric or magnetic pen to write and draw on the surface of the board and from digital input signals to the electrophoretic cell array.

2. Description of the Prior Art

The usefulness of a conventional electronic whiteboard is still limited by a single input-mode operation that an electronic whiteboard can only receive input by manually writing or drawing directly on the surface of the whiteboard using an electric or magnetic pen. Since it allows only manual operations on the surface of the board, real time displays in a meeting for immediate viewing and discussion of more complicate or detail illustrations may become very inconvenient unless manual efforts are employed to draw the details of such illustrations before the meeting. Furthermore, limited by this manual input-mode of configuration and operation, a conventional electronic whiteboard is not able to receive signal input from an electronic file that contains graphic or textual contents as displayable elements. There is still a gap that prevents direct communications between the conventional whiteboards and the media-rich contents broadly available as electronic files ready for display on many different kinds of media display devices. Due to these limitations, the conventional whiteboard still remains basically as a write/draw then copy device employed to record the hand writing information. As a hand-writing input device, a conventional electronic whiteboard is further limited by the disadvantage that dust or debris from using color chalks or ink for writing on the board may cause health and environmental hazards.

For these reasons, instead of electronic whiteboard, image projections applying liquid crystal display (LCD) or MEM projector are often selected to display images for discussions in a meeting, particularly when illustrations of more complicated or detailed images are necessary. However, image projection display often requires projection equipment of higher cost. In order to have a better view of the projected images, a low lighting background is often required. The greatest disadvantage of using the projected images for discussion is the limitation that the projected images can only be changed from a computer. An option of making changes with handwriting or drawing on the projected images is not available. For the purpose of providing images for real-time discussion, this limitation significantly reduces the effectiveness of real time presentation and discussions. Furthermore, in order to project the image on a display surface, a person making presentation or coordinating a discussion must stay away from the projection light so that the projected images are not blocked. Also, when such person standing next to the display images facing the projection lights, a view of the audience or meeting participants for sensing their reactions to the displayed images and the discussions is further hindered. Therefore, there is still a need in the art of image display to provide improved methods and devices such that these difficulties and limitations can be overcome.

An electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time. EPDs of different pixel or cell structures have been reported previously, for example, the partition-type EPD (M. A. Hopper and V. Novotny, *IEEE Trans. Electr. Dev.*, 26(8):1148–1152 (1979)) and the microencapsulated EPD (U.S. Pat. Nos. 5,961,804 and 5,930,026).

An improved EPD technology was recently disclosed in co-pending applications, U.S. Ser. No. 09/518,488, filed on Mar. 3, 2000 (corresponding to WO01/67170 published on Sep. 13, 2001), U.S. Ser. No. 09/759,212, filed on Jan. 11, 2001, U.S. Ser. No. 09/606,654, filed on Jun. 28, 2000 and U.S. Ser. No. 09/784,972, filed on Feb. 15, 2001, all of which are incorporated herein by reference. The improved EPD comprises isolated cells formed from microcups of well-defined shape, size and aspect ratio and filled with charged particles dispersed in a dielectric solvent, preferably a halogenated solvent, particularly a perfluorinated solvent. The filled cells are individually sealed with a polymeric sealing layer, preferably formed from a composition comprising a material selected from a group consisting of thermoplastics, thermosets and their precursors.

All of the previously known and the microcup-based electrophoretic displays may be constructed into the form of a board to be used as e-signs or e-bulletins. A co-pending pending patent application filed by the Applicants of this invention discloses whiteboards implemented with magnetophoretic and electromagnetophoretic display technologies. In this invention, microcup based electrophoretic display is used for whiteboard application. ITO electrode layer is eliminated in the disclosed designs, which further reduces the cost.

SUMMARY OF THE PRESENT INVENTION

The display of the present invention comprises two layers of insulating substrate, at least one of which, usually the one on the viewing side, is transparent, and an array of display cells sandwiched between the two layers of substrate. The display may optionally comprise a conductive layer placed between the cell and one of the substrate layers.

The display cells are filled with an electrophoretic fluid in which charged particles are dispersed in a solvent or solvent mixture. The solvent or solvent mixture may comprise a contrast colorant, which may be a dye or pigment.

The device further comprises a writing means, such as a high voltage electric writing head or a high voltage pen, for generating an image. The writing means may be on the viewing side or behind the non-viewing side.

The device may also optionally comprise an erasing means to electrically erase the image. The erasing means may also be placed on the viewing side or behind the non-viewing side.

Similar to conventional electrophoretic displays (EPDs or EPIDs), whiteboards of this invention are bistable and have a very wide viewing angle. Many different driving mechanisms and circuitry designs may be employed to achieve optimum performances of the displays of this invention. Most of them do not require the use of a transparent conductor film, such as ITO film, which is expensive, fragile and often transmits or reflects less than 90% of the incipient visible light. As a result, the displays of the invention are much more flexible and durable than conventional displays and provide images of high contrast ratio, wide viewing angle and high reflectance in the Dmin area. Furthermore, the present invention provides a great number of alternatives in design, and a particular type of design within the scope of the invention may be easily constructed to meet the needs for a variety of applications.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
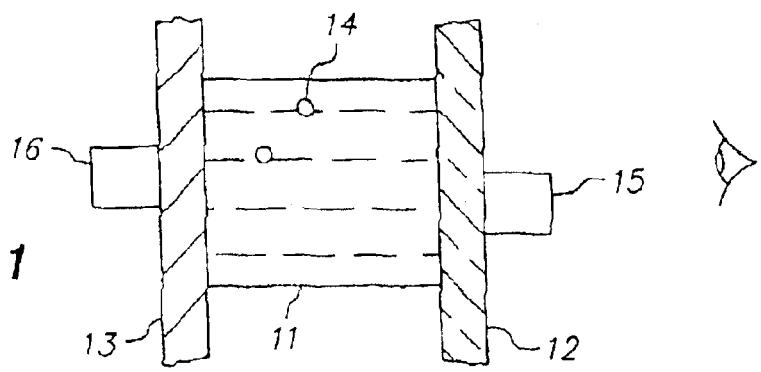
FIGS. 1–9 depict a variety of designs for the magnetophoretic and electromagnetophoretic display of the invention.

The present invention is directed to a display device, which comprises two layers of substrate, at least the viewing side is transparent, and an array of display cells sandwiched between the two layers of substrate. In the context of this application, the term "viewing side" refers to the side seen by the viewer whereas the term "non-viewing" side refers to the side opposite from the viewing side.

Suitable substrates include sheets, plates or films prepared from poly(ethylene terephthalate), poly(ethylene naphthalate), polycarbonate, polysulfone, polyimide, epoxy, phenolic, acrylics, unsaturated polyester, polyamide, polyurethane, polyurea and their composites. In the embodiments of this invention where an electric field is used to drive or erase an image, a conductive layer on the substrate is needed. Suitable conductive layers include Al, Cu, Au, Ag, Ni, Sn, ITO (Indium Tin Oxide) and their alloys or composite films.

The display cells sandwiched between the two layers of substrate may be the conventional type of display cells (e.g., the partition-type cells), the microcapsule cells (prepared according to U.S. Pat. Nos. 5,961,804 and 5,930,026) or the cells prepared according to the microcup technology disclosed in WO01/67170 and related applications.

As disclosed in the co-pending application, magnetophoretic display (MPD) and electromagnetophoretic display (EMPD) are used in whiteboard application, in which the cells are filled with a magnetophoretic or electromagnetophoretic fluid comprising magnetic particles dispersed in a solvent or solvent mixture. The magnetic particles may be dispersed by any of the well-known methods, including grinding, milling, attriting, microfluidizing and ultrasonic techniques. For example, magnetic particles in the form of a fine powder are added to the suspending solvent and the resulting mixture is ball milled or attrited for several hours to break up the highly agglomerated dry pigment powder into primary particles.

Low vapor pressure, non-hygroscopic solvents are preferred for the magnetophoretic or electromagnetophoretic fluid. Examples of useful solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, low viscosity polyethers such as polypropylene glycols and block copolymers of ethylene glycol and propylene glycols, low viscosity silicone oils, alkyl or alkylaryl esters and ketones, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane and pentachlorobenzene, perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J. and perfluoropolyalkylether such as Galden from Ausimont or Krytox Oils and Greases K-Fluid Series from DuPont, Del. In one preferred embodiment, poly (chlorotrifluoroethylene) is used as a dielectric solvent. In another preferred embodiment, poly(perfluoropropylene oxide) is used as a dielectric solvent.

Sedimentation or creaming of the pigment particles may be eliminated by microencapsulating the particles with suitable polymers to match the specific gravity to that of the suspending solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation. Well-known procedures for microencapsulation have been disclosed in Kondo, Microcapsule Processing and Technology, Microencapsulation, Processes and Applications, (I. E. Vandegaer, ed.), Plenum Press, New York, N.Y. (1974), and in Gutcho, Microcapsules and Microencapsulation Techniques, Nuyes Data Corp., Park Ridge, N.J. (1976), both of which are hereby incorporated by reference.

Magnetic particles prepared from highly magnetic compounds and metals or alloys are preferred. Examples of magnetic materials useful in this invention include gamma ferric oxide, acicular magnetite, cobalt-modified or adsorbed ferric oxide, berthollide ferric oxide, chromium dioxide, metals or alloys such as stainless steel, Fe—Co, Fe—Ni, Fe—Co—Ni, Co—Ni, Co—Cr and Fe—Co—V alloys, organic polyradicals such as polymers with organic radicals in the side chain, main-chain conjugated polymers with organic radicals, two dimensional polyradicals, polymers containing paramagnetic metalloporphyrins as side chains and polymers containing paramagnetic metal ions, e.g., Cu(II), Ni(II), Mn(II) or VO(II), in the main chain. Other useful magnetic materials can be found in references such as "Magnetic Recording Handbook" by Marvin Camras; Van Nostrand Reinhold Co., (1988); and M. Kamachi, "Magnetic Polymers" in "Functional Monomers and Polymers", ed. By K. Takemoto, R. M. Ottenbrite and M. Kamachi; Marcel Dekker, Inc., (1997).

Specific examples of organic polyradicals include, but not limited to, those shown in the references identified above and several U.S. patents (e.g., U.S. Pat Nos. 4,631,328, 4,594,400, 4,552,928 and 4,769,443). Organic polyradicals shown by Kanachi in "Magnetic Polymers" include those containing 2,2,6,6-tetramethylpiperidine-1-oxyl as a side chain, thermally annealed polyphenylacetylene, those with phenoxy or nitroxy radicals, poly(1,3-phenyleneethynylene) with pendant nitronyl nitroxide or t-butylnitroxyl, two-dimensional polymers, such as that obtained by reacting 1,3,5-triaminobenzene with iodine, those with a repeating unit derived from indigo, those obtained from the catalyst-free 1,3-dipolar cycloaddition of 1,3-bis-(3-sydnone) and N',N'-(1,4-phenylene)bismaleamide, those containing paramagnetic ions either in the side chain or in the main chain. Those containing paramagnetic ions in the side chain include those containing tetraphenylporphyrin (TPP) moieties, especially those derived from paramagnetic metal ions, for example, Cu(II), Ag(II), VO(II) and Co(II), and that derived from the reaction of TPP-Mn(II) and tetracyanoethylene in toluene. Those containing paramagnetic ions in the main chain include a heterobinuclear complexes of Cu(II) and VO(II), an inorganic polymer, $MnCu(pbaOH)(H_2O)_3$ with regularly alternating magnetic centers, where pbaOH is 2-hydroxy-1,3-propylenebis(oxamato), polymers composed of 2-substituted 4,4,5,5-tetramethylimidazoline-1-oxyl-3-oxide and derived from Cu(II), Ni(II) or Mn(II), linear chain polymers of $M(hfac)_2(NIT)R$ where M is Cu(II), Ni(II) or Mn(II), (NIT)R is 2-alkyl-4,4,5,5-tetramethylimidazoline-1-oxyl-3-oxide and hfac is hexafluoroaceteylacetonate, and three dimensional structures, such as $(rad)_2Mn_2[Cu(opba)]_3$ $(DMSO)_2:2H_2O$, where rad is 2-(4-N-methylpyridinium)-4,4,5,5-tetramethylimidazoline-1-oxyl-3-oxide, opba is o-phenylenebis(oxamato) and DMSO is dimethyl sulfoxide. Other polymeric radical containing compounds, with the identity of the radical and its location, are those described in U.S. Pat. Nos. 4,631,328 (various dyes [anthraquinone, stilbene, mono-, bis-, tris-azo], side chain), U.S. Pat. No. 4,594,400 (thioxanthone, side chain), U.S. Pat. No. 4,552,928 (di- and triphenylamine, side chain) and U.S. Pat. No. 4,769,443 (piperidine, side chain). Some of these organic polyradicals may be prepared by including radical precursors in the prepolymer mixture, effecting polymerization and then conversion to the radicals.

In one embodiment of MPD and EMPD, contrast colorant particles are magnetized by coating the colorant particles (e.g., $TiO_2$, ZnO, or organic pigments such as carbon black, phthalocyanine and other organic pigments) with magnetic materials by, for example, sputtering, vacuum deposition, electrodeposition, electroplating or electroless plating. In another embodiment of MPD and EMPD, the colorant pigment particles are microencapsulated in a polymer matrix and magnetic particles are mixed with the pigment particles before the microencapsulation process. Submicron magnetic or metal particles are the most preferred in this case. In a further embodiment of MPD and EMPD, colorant particles are magnetized by coating or encapsulating the particles with an organic polyradical or magnetic polymer mentioned above.

The magnetized particles may be charged or non-charged. Similarly, the contrast colorant particles may also be charged or non-charged. For the charged particles, they may exhibit a native charge, or may be charged explicitly using a charge control agent, or may acquire a charge when suspended in the suspending medium. Suitable charge controlling agents are well known in the art; they may be polymeric or non-polymeric in nature, and may also be ionic or non-ionic. Particles having high image bistability, low viscosity, and high dispersion stability against sedimentation, creaming, flocculation and network formation are preferred.

FIG. 1 depicts a magnetophoretic display. A display cell (11) is sandwiched between two layers of substrate (12 and 13). At least one of the two layers is transparent and the transparent layer (12) is on the viewing side. The cell is filled with a reflective or white (the primary color), non-charged magnetic particles (14) dispersed in a clear (contrast) color solution. Useful magnetic particles for this case include metal particles or metallized particles prepared by, for example, sputtering, vacuum deposition, electrodeposition, electroplating, electroless plating, magnetic polymer coated or microencapsulated white pigments particles such as $TiO_2$ and ZnO, and microcapsules containing a mixture of white pigments and magnetic particles, particularly metal particles. Dyes or colorant pigments having a particles size well below the visible light scattering range (0.2–0.4 micrometer) are useful for preparing the clear contrast color solution.

Initially by applying a magnetic eraser (15) placed on the viewing side (12) of the display, all the reflective or white (primary color) magnetic particles are attracted to the viewing side, resulting in the color of the particles as the background seen by the viewer. A magnetic writing head (16), in this design, is placed behind the non-viewing side (13). The writing head is controlled by a PC or a tablet (not shown). When the writing head is turned on, the white particles are attracted to the non-viewing side. For the areas where the white or reflective particles are on the non-viewing side, the color of the dispersion medium (i.e., the contrast color) is seen from the viewing side, thus creating a contrast color-on-white or contrast-on-primary color image.

Figure 2:
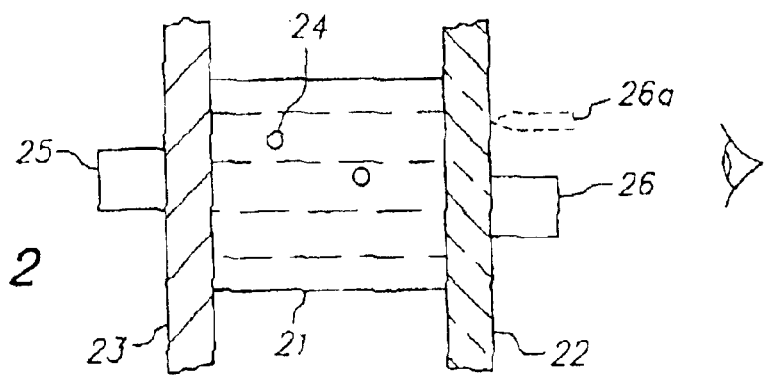

FIG. 2 illustrates an alternative embodiment of the MPD in which the cell is also filled with non-charged, reflective or white (primary color) magnetic particles (24) dispersed in a clear contrast color solution. In this design, a magnetic eraser device (25) is placed behind the non-viewing side (23). Initially the eraser attracts the white or reflective magnetic particles to the non-viewing side which generates a contrast background color (i.e., the color of the dispersion medium) seen from the viewing side. In this design, the image may be created by a magnetic writing device or writer (26) placed on the viewing side. When the writer (26) is turned on and the eraser (25) is turned off, the white or reflective magnetic particles are attracted to the viewing side, thus generating a white-on-contrast color or primary-on-contrast color image. Alternatively, a magnetic pen (26a, on the viewing side) may be used instead of the magnetic writing head (26) to create the same image discrimination.

Figure 3A:
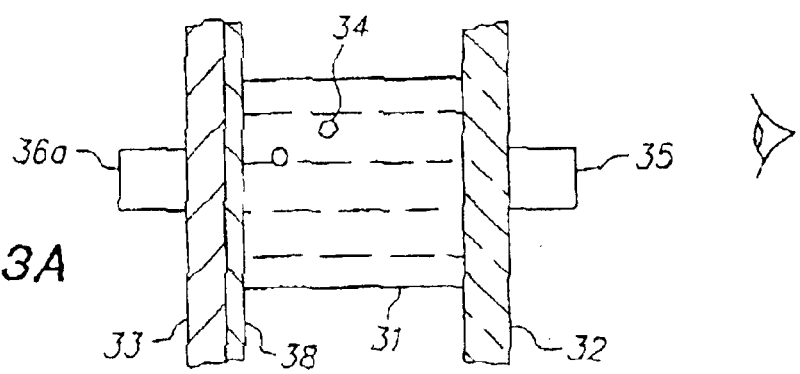
Figure 3B:
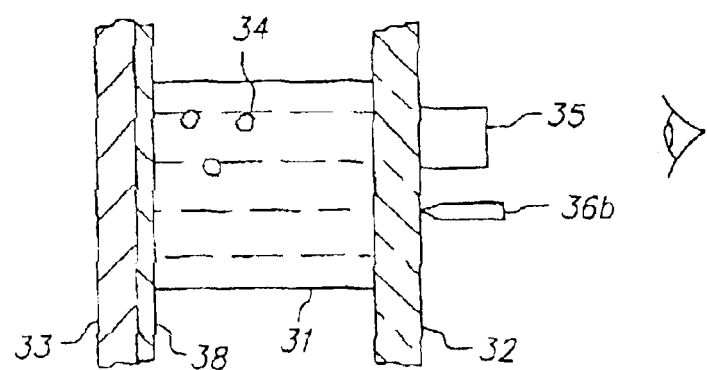

FIG. 3 illustrates another alternative embodiment in which the cell is filled with charged, white (primary color) or reflective magnetic particles (34) dispersed in a clear solvent of a contrast color. A display cell (31) is sandwiched between two layers of substrate (32 and 33). At least one of the two layers is transparent and the transparent layer (32) is on the viewing side. However, in this case, a layer of conductor film (38) is placed between the cell (31) and the layer of substrate (33) on the non-viewing side. A magnetic eraser (35) is placed on the viewing side. By applying the magnetic erasing means, the white or reflective magnetic particles are attracted to the viewing side thus generating a white or primary color background. In this design, an image may be created by either a magnetic writing head (36a) placed behind the non-viewing side (FIG. 3A) or a high voltage electric writing head (not shown in FIG. 3B) or a high voltage electric pen (36b) on the viewing side (FIG. 3B). In the first scenario, when the magnetic writing head is applied, it attracts the white (primary color) particles to the non-viewing side thus creating a contrast color-on-white (or on primary color) image. In the second scenario when a high voltage electric writing head or electric pen is used, an image may be created by applying appropriate voltages to the electric pen and the conductor film layer (38). For example, if the conductor film has polarity opposite from the particles and the electric writing head or pen has the same polarity as the particles, the white or primary color particles inevitably migrate to the non-viewing side thus also generating a contrast color-on-white (or primary color) image. This embodiment is one of the preferred.

There are still further embodiments of the present invention in which a mixture of black or colored magnetic particles and white, non-magnetic particles are dispersed in a colorless clear solvent. The particles may be charged or non-charged. If both types of particles are charged, it is preferable to have the same polarity.

Figure 4:
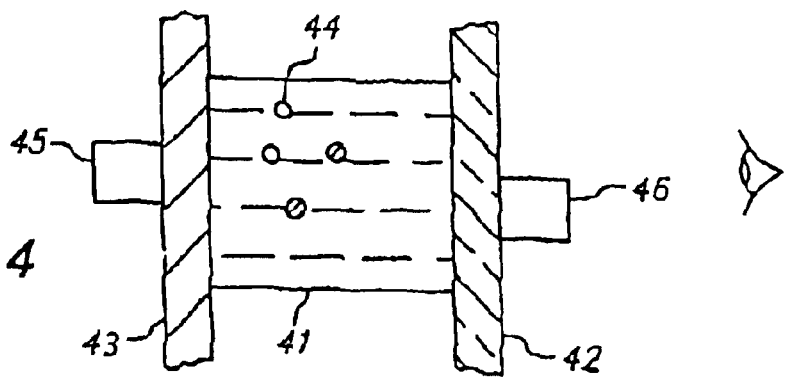

In the design as illustrated in FIG. 4, both types of particles are non-charged. The design does not comprise a conductive film layer. A magnetic eraser (45) is placed behind the non-viewing side. When the eraser head is applied, the black or color magnetic particles are attracted to the non-viewing side while the white non-magnetic particles are randomly dispersed in the dispersion medium, thus creating a white background color. The writing means (46) in this design is placed on the viewing side and the writing means may be either a magnetic writing head or a magnetic pen. When the magnetic writing head or the magnetic pen is turned on, the black or color magnetic particles are attracted to the viewing side thus generating a black (contrast color)-on-white image. This is also one of the preferred embodiments.

Figure 5:
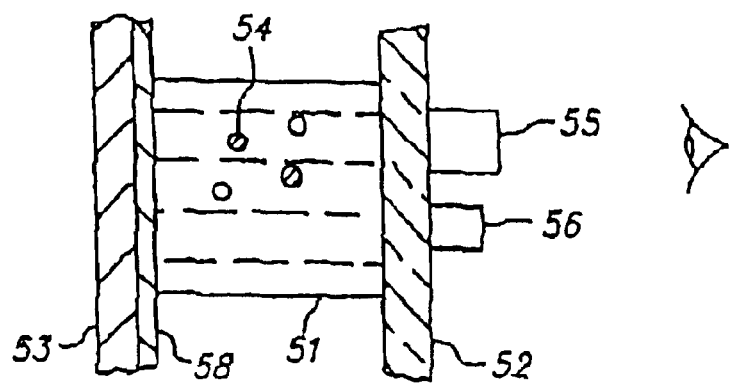

FIG. 5 illustrates an embodiment of the present invention in which a mixture of charged, black or color magnetic particles and charged, white non-magnetic particles are dispersed in a colorless clear solvent. This design also comprises a conductive film layer (58). In this case, an electric erasing means (55) is placed on the viewing side and it may be a high voltage electric eraser head or a manual high voltage electric eraser. The white and black particles may carry opposite charge polarity or the same polarity. If they are of the same polarity, the two types of particles should have enough difference in electrophoretic mobility for image discrimination. The conductive film layer (58) has polarity opposite from the black particles and the electric erasing means has the same polarity as the black particles. As a result, the black or color magnetic particles migrate to the non-viewing side because of the electric force and the white particles either migrate to the viewing side or, to a large degree, remain randomly dispersed in the dispersion medium, thus creating a white background. The white background may also be achieved by applying a magnetic erasing means from the non-viewing side. The writing means (56) in this embodiment is also on the viewing side and it may be either a magnetic writing head or a magnetic pen. When the magnetic writing means is applied, it attracts the black magnetic particles to the viewing side thus generating a black (contrast color)-on-white image.

Figure 6:
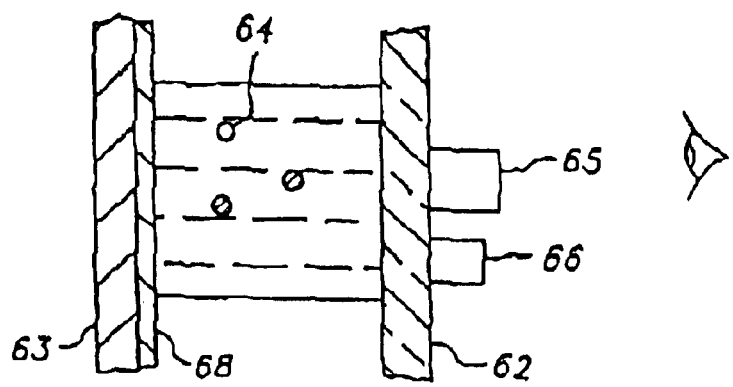

Alternatively, the electromagnetophoretic display may have a mixture of charged, black or contrast color magnetic particles and non-charged, white non-magnetic particles dispersed in a colorless clear solvent, as shown in FIG. 6. When an electric erasing means (65) is applied from the viewing side (provided that the conductive film layer has a charge polarity opposite to that of the black or color particles and the electric erasing means has the same polarity), only the black or color particles migrate to the non-viewing side and the white particles are randomly dispersed in the dispersion medium, generating a white background color seen from the viewing side. The white background may also be achieved by applying a magnetic erasing means from the non-viewing side. The writing means (66) in this design is also on the viewing side and it may be a magnetic writing head, a magnetic pen, a high voltage electric writing head or a high-voltage writing pen. As shown in FIG. 6, when the magnetic writing means is applied, it attracts the black or contrast color magnetic particles to the viewing side thus generating a black (contrast color)-on-white image. When an electric writing means having the opposite polarity from the black particles is applied, the writing means attracts the black particles to the viewing side, thus also generating a black (contrast color)-on-white image.

Figure 7:
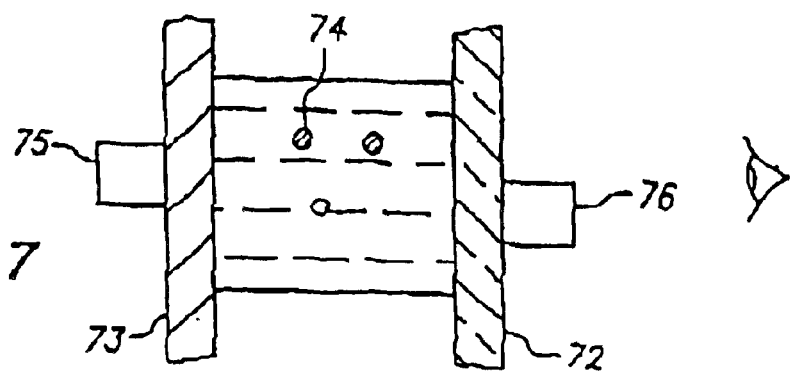

FIG. 7 illustrates another embodiment of MPD. This design employs a mixture of non-charged, white or reflective magnetic particles and non-charged, contrast color or black non-magnetic particles dispersed in a colorless clear solvent. The design does not comprise a conductive film layer. A magnetic eraser head (75) is placed behind the non-viewing side. When the eraser head is applied, the white magnetic particles are attracted to the non-viewing side while the black or color non-magnetic particles are randomly dispersed in the dispersion medium, thus creating a black or contrast color background. The writing means (76) in this design is placed on the viewing side and the writing means may be either a magnetic writing head or a magnetic pen. When the magnetic writing head or the magnetic pen is turned on, the white or reflective magnetic particles are attracted to the viewing side thus generating a white (reflective)-on-black (contrast color) image.

Figure 8:
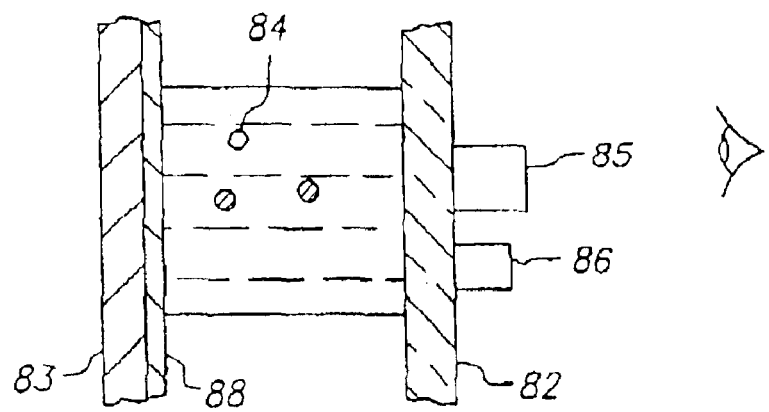

FIG. 8 illustrates a further embodiment of the EMPD. In this embodiment, a mixture of charged, white or reflective magnetic particles and charged, black or contrast color non-magnetic particles are dispersed in a colorless clear solvent. The design also comprises a conductive film layer (88). In this case, the erasing means (85) is placed on the viewing side and it may be a high voltage electric eraser head, a manual high voltage electric eraser, a magnetic eraser head or a manual eraser head. In one scenario, the two types of particles may carry opposite charges, the conductive film layer has same polarity as the white or reflective magnetic particles and the electric erasing means has the opposite polarity. In other words, the conductive film layer has polarity opposite of the black or color non-magnetic particles and the electric erasing means has the same polarity as the black non-magnetic particles. As a result, the white or reflective particles migrate to the viewing side by the electric force creating a white or reflective background color. In another scenario, the white or reflective background color may also be created by a magnetic erasing means placed on the viewing side. The writing means (86) in this embodiment is also on the viewing side and it may be either a high voltage writing head or a high voltage pen. When the electric writing means is applied, it attracts the black or contrast color non-magnetic particles to the viewing side (provided that the electric writing means has the same polarity as the white or reflective magnetic particles; but opposite polarity to the black or color non-magnetic particles), thus generating a black (contrast color)-on-white (reflective) image. This is also one of the preferred embodiments.

Figure 9:
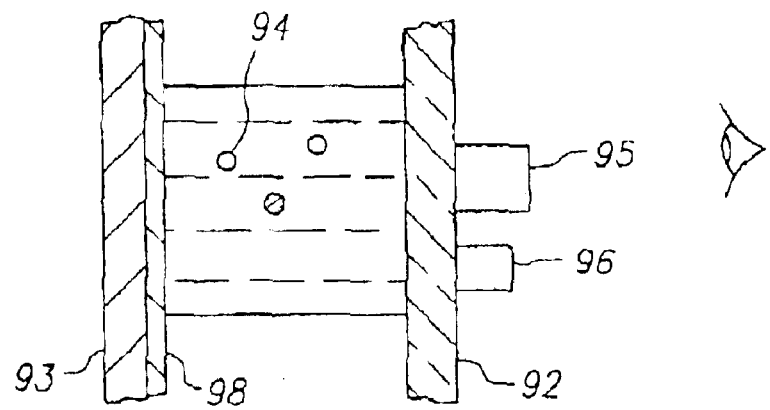

Alternatively, the black or contrast color non-magnetic particles in this design are non-charged or carry a charge of the same polarity as the magnetic particles, but with a significantly lower electrophoretic mobility. As a result, in the scenario illustrated in FIG. 9, when an electric erasing mean (95) is applied from the viewing side (provided that the conductive film layer has opposite polarity as the white or reflective magnetic particles and the electric erasing means has the same polarity), only the white or reflective particles migrate to the non-viewing side and the black or contrast color particles remain randomly dispersed in the dispersion medium, generating a black or contrast color background seen from the viewing side. The black or contrast color background may also be achieved by applying a magnetic erasing means from the non-viewing side. The writing means (96) in this embodiment is also on the viewing side and it may be a magnetic writing head, a magnetic pen, a high voltage electric writing head, or a high-voltage writing pen. As shown in FIG. 9, when the magnetic writing means is applied, it attracts the white or reflective particles (which are magnetic) to the viewing side thus generating a white (reflective)-on-black (contrast color) image. When an electric writing means is applied, the white or reflective particles may also be attracted to the viewing side generating a white(reflective)-on-black (contrast color) image.

Figure 10:
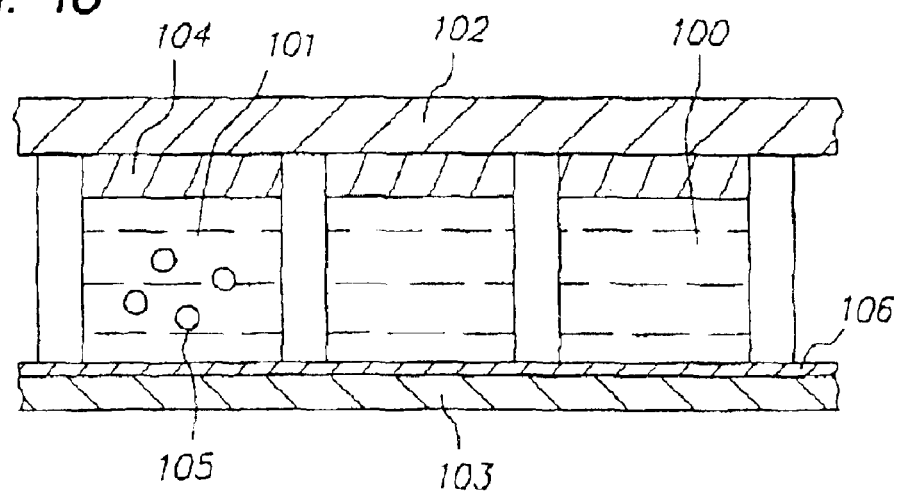
FIG. 10 depicts a preferred embodiment of the present invention in which the cells are individually sealed.

FIG. 10 depicts a preferred embodiment of the EMPD. The cells (100) are sandwiched between the two layers of substrate (102 and 103) and of well-defined size, shape and aspect ratio and are individually sealed with a polymeric sealing layer (104). The display may optionally comprise an additional adhesive layer (not shown) between the substrate (102) and the polymeric sealing layer (104). The particles (105) suspended in the electromagnetophoretic fluid (101) are magnetized and optionally charged. The electromagnetophoretic display (EMPD) of this invention may further comprise a polymeric layer (not shown) between the substrate (103) and the electromagnetophoretic fluid (101). The "microcup" based cells may be prepared by a microembossing process or by photolithography as described in WO01/67170 and related applications. There may be a conductor film layer (106) optionally placed between the cells (100) and one of two substrate layers (102 & 103). The device as described has a recording means and optionally an erasing means as depicted in FIGS. 1–9.

Figure 11:
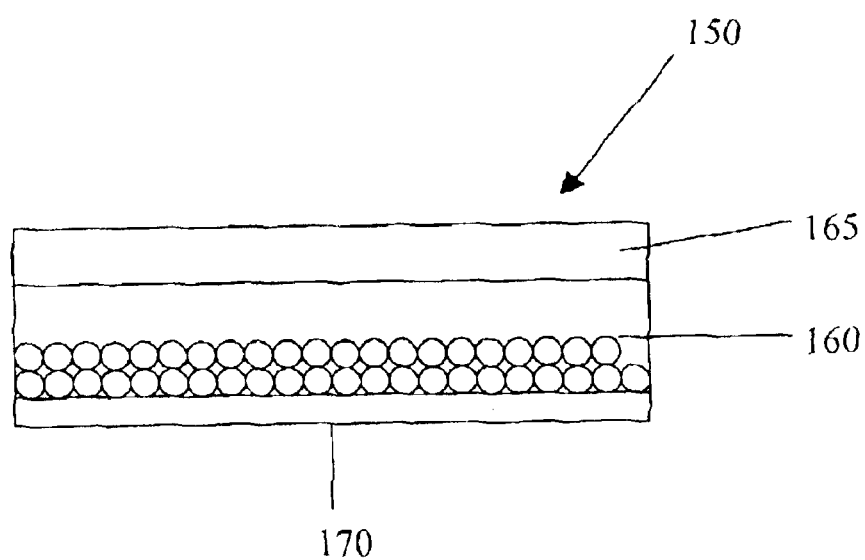
FIG. 11 depicts a preferred embodiment of the present invention where the electrophoretic dispersion is sandwiched between an insulator layer and a common electrode layer.

The embodiments specifically exemplified above are clearly not exhaustive. It should be understood that various magnetophoresis and electro-magnetophoresis may be constructed by varying the following elements:

1) magnetic particles of one single color which may be
   i) charged; or
   ii) non-charged;
2) two types of color (primary color and contrast color) particles, one of which is magnetic and
   a) both types of particles are non-charged;
   b) only one of them is charged;
   c) both are charged; but carrying opposite charges
   d) both carry charges of the same polarity but one of them has a significantly higher electrophoretic mobility than the other.
3) color of the solvent in which the particles are dispersed;
4) an electric erasing means or magnetic erasing means
5) the erasing means may be on the viewing or non-viewing side
6) an electric writing means or a magnetic writing means
7) the writing means may be on the viewing or non-viewing side FIG. 11 shows a basic structure of a sealed EPD microcup 150 to form an electric whiteboard for this invention. The electrophoretic dispersion 160 is contained in a sealed microcup having a depth in a range between ten to fifty micrometers (10–50 $\mu$m) surrounded by an insulator layer 165 and a common electrode layer 170. On the top viewing side of the EPD cell is the insulator layer 165 formed as a polymer layer with a layer thickness of approximately 25 to 30 micrometers. The material selected to form this layer 165 is a transparent and scratch resistant polymer material. Depending on the material chosen to form this insulator layer, a layer thickness may have a range between five to five hundred microns (5–500 $\mu$m). The driving voltage requirement of the EPD cell is directly related to the thickness of this insulator layer. It is highly desirable that this layer can be made as thin as possible to reduce the driving voltage. The bottom layer is a common electrode layer 170 that can be formed by aluminum-PET or copper-PET layer.

The dispersion 160 as that filled in each of the sealed microcups cells 150 as shown in FIG. 11 may be filled with electrically charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and IEEE Trans. Electron Devices, ED-24, 827 (1977), and J. Appl. Phys. 49(9), 4820 (1978). The charged pigment particles visually contrast with the medium in which the particles are suspended. The medium is a dielectric solvent, which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

The suspending medium may be colored by dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not become swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

Figure 12:
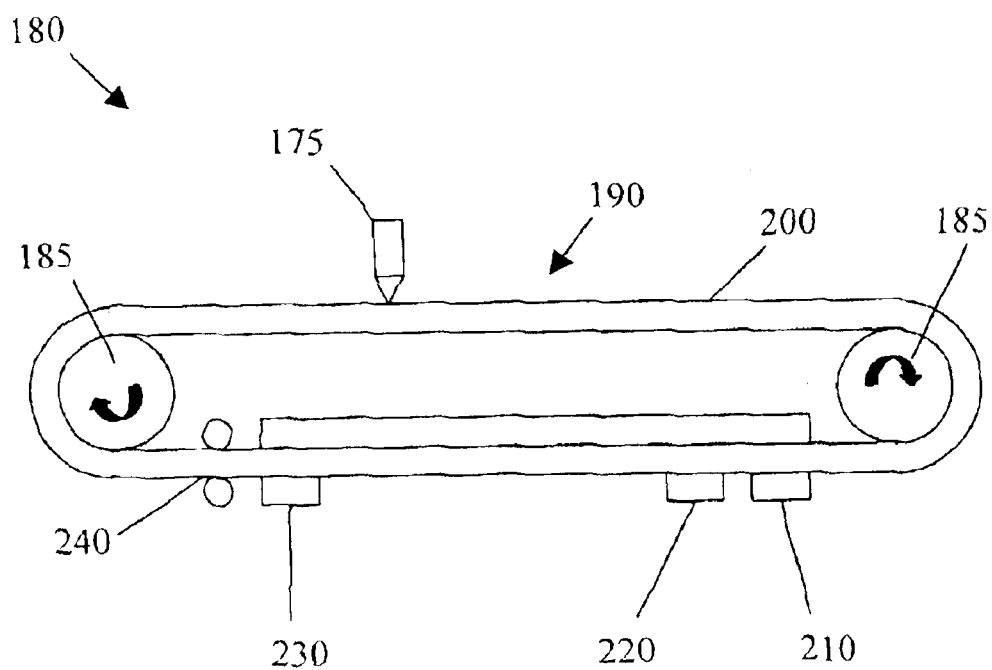
FIG. 12 shows a top cross sectional view of the whiteboard display system of this invention.

FIG. 12 shows a top cross sectional view of an electrical electrophoretic display (EPD) whiteboard 180 of this invention. The EPD whiteboard is formed with a viewing and writing side 190 protected by the scratch resistant insulator layer 165 (see FIG. 11) for information display and for writing onto the board with an electro pen 175. The EPD web 200 is wrapped around two rollers 185 to allow the EPD web 200 to roll around to the backside for refreshing the display, to obtain a hardcopy of the displayed and written information, or to erase the displayed and written information from the whiteboard. A linear scanner 210 is provided on the backside to scan the whiteboard surface to obtain a hard copy of the displayed and written information on the whiteboard. The scanner 210 is connected to a printer or an input device or to a data storage device (not shown for the sake of simplicity and clarity in describing the essence of this invention) to either print the hardcopy or store the scanned images into the data storage device. A high voltage electro-eraser head 220 is applied to precondition the EPD cells of the EPD web and prepared for writing onto the EPD web by applying a high voltage writing head 230 that may include an array of writing heads while applying a voltage between 50 to 2000 volts. A discharge roller 240 is used to discharge the EPD to assure safe operation of the electronic whiteboard and performance stability of displaying and writing the information onto the whiteboard. The electronic pen is powered by a high voltage source and is ready to manually write additional information onto the board now supplemented by the displayed information written onto the board by the electro-writing head 230.

Figure 13:
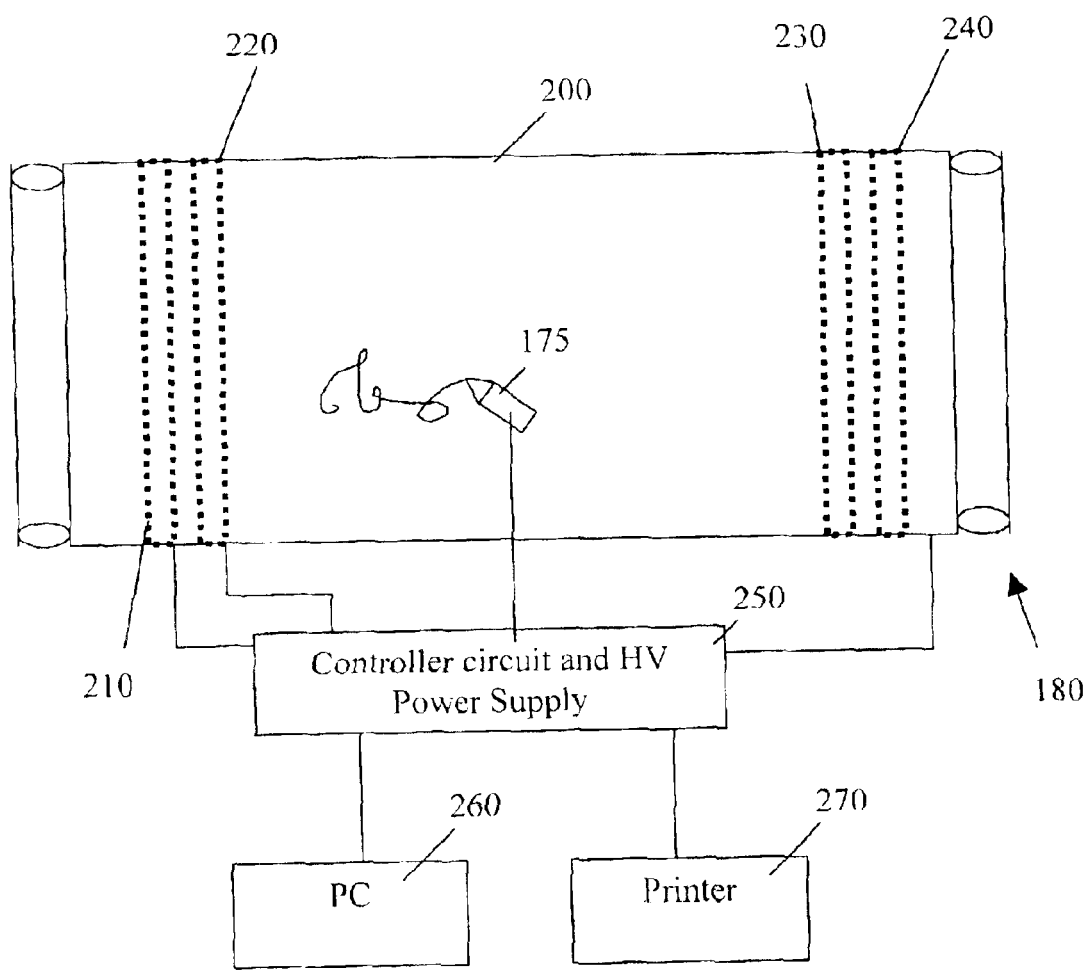
FIG. 13 shows a front view of the whiteboard display system of this invention.
Figure 14A:
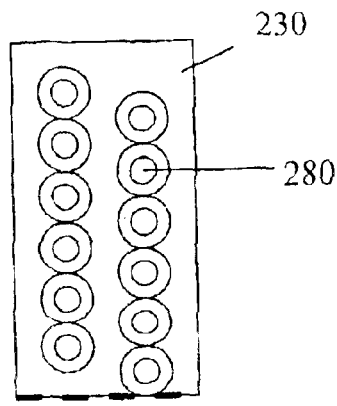
FIG. 14A shows a top view and FIGS. 14B to 14E show alternate side cross sectional views of a high voltage electric writing head.
Figure 14B:
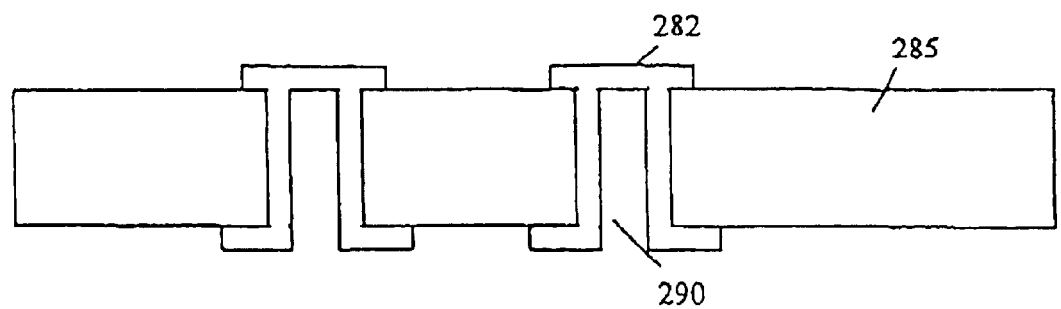
Figure 14C:
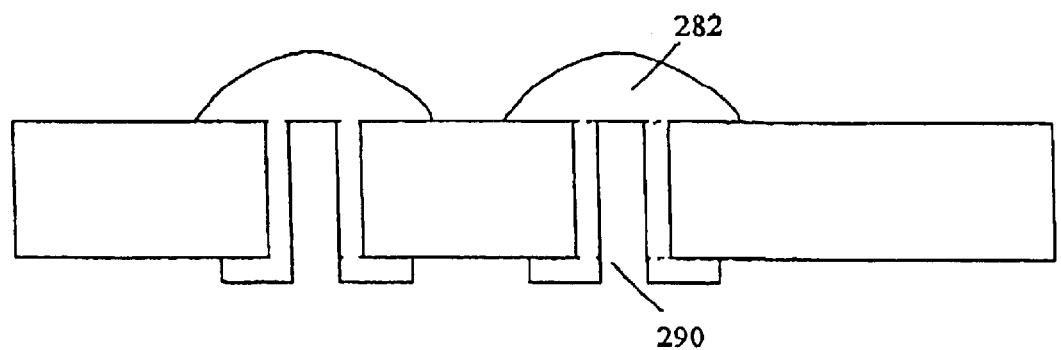

FIG. 13 shows a functional block diagram of an EPD whiteboard of this invention. A controller circuit and a high voltage power supply 250 are employed to provide a high driving voltage to the EPD web 200. In the meanwhile, the controller 250 sends the driving control signal and data to the electro writing head 175. A high voltage MOSFET may be implemented to manufacture the writing head switch to switch the writing head on the electro pen 175 according to the data and the control signal. The controller 250 also controls the operation of the image scanner 210, the eraser 220, and the printer 270. The image for display on the whiteboard can be provided by a personal computer PC 260 or other image and data sources. A preferred embodiment for a high voltage writing head that can be implemented on the image writer 230 is shown in FIGS. 14A to 14C. Referring to FIG. 14A, the writing head 230 includes an array of print heads 280 arranged in two interlaced columns. Each writing pin 280 is spring loaded to provide adequate contact and pressure against the EPD web 200 for writing the image onto the whiteboard. FIGS. 14B and 14C are two side cross sectional views for showing the structure of the writing pin 280 formed on a printed circuit board (PCB) or a flexible print circuit (FPC) 285. In FIG. 14B, blind (one side surface is covered) through holes 290 are formed on the PCB or FPC 285 to form a flat platform 282 for covering the through holes 290 and for supporting the writing pin 280. In FIG.

14C, gold, silver, nickel or combinations of these metal elements is plated over the platform 282 covering the blind through holes to provide smooth surface with improved robustness in writing operations.

Figure 14D:
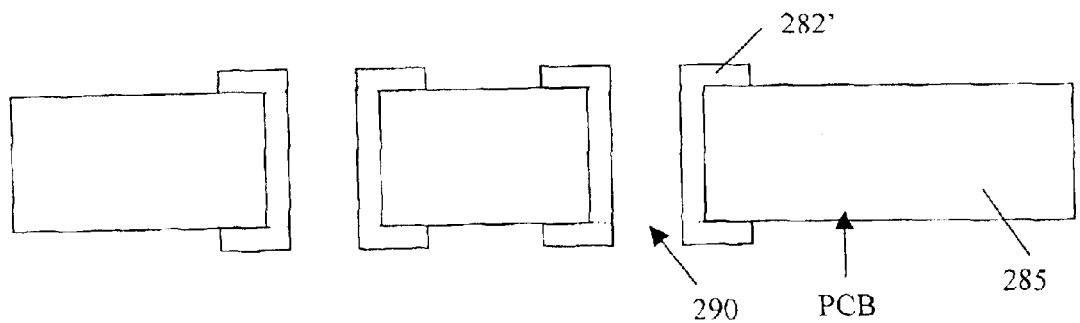
Figure 14E:
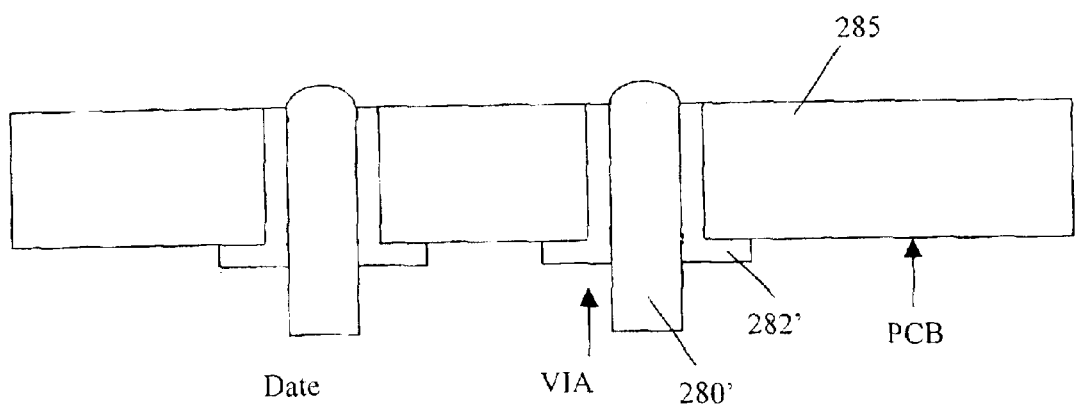

Typically there is overlap required between each channel, so at least two columns are needed. Sometimes, to ease of head layout four columns or more rows of writing pins are implemented. All these writing pins 280 should be applied with the same voltage. However, for grayscale EPD, each channel might be applied with different voltage to generate different gray levels. For the eraser head 220, reverse polarity voltages need to be applied to carry out an erase operation. For a reset (complete erase) head, it could be a metal bar or roller contacting across the surface of the panel. For a manual erase, it could be implemented with a conductive foam with insulated handle. The scanner head 210 may be implemented with a CCD or CMOS linear image sensors as typically used in the white board now commonly available in the marketplace. FIGS. 14D and 14E are cross sectional views for showing the structure of an alternate preferred embodiment. In FIG. 14D, through holes 290' are formed on the PCB 285 and each through holes is platted with a supporting platform 282' surrounding the through holes 290. A conductive wire 280' are then inserted into the through holes 290 to function as the writing head 280'.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An image display comprising:
   an array of sealed microcups containing particles of a designated electric, magnetic or both electric and magnetic characteristic suspended in a solvent wherein a surface of a plurality of said sealed microcups constituting a transparent surface;
   an electric, magnetic or electromagnetic image writing/drawing means applied to said particles to form an image viewable from said transparent surface; and
   an electric, magnetic or electromagnetic erasing means applied to said particles to erase said image.

2. The image display of claim 1 wherein:
   said array of sealed microcups containing electrically charged particles.

3. The image display of claim 1 wherein:
   said array of sealed microcups containing an electrophoretic dispersion.

4. The image display of claim 1 wherein:
   each of said sealed microcups having a depth ranging from ten to fifty micrometers (10–50 $\mu$m).

5. The image display of claim 1 further comprising:
   an image scanning means for scanning and recording said image.

6. The image display of claim 1 further comprising:
   a processor-controlled image writing means receiving input data from an image data source for writing an image viewable from said transparent surface.

7. The image display of claim 6 wherein:
   said processor-controlled image writing means is an electrical writing head.

8. The image display of claim 6 wherein:
   said processor-controlled image writing means is disposed on a backside opposite said transparent surface.

9. The image display of claim 6 wherein:
   said processor-controlled image writing means is disposed on a viewing side on a same side as said transparent surface.

10. The image display of claim 1 further comprising:
    a neutralizing means for neutralizing an electromagnetic effect from said particles contained in said sealed microcups.

11. The image display of claim 1 further comprising:
    a surface moving means for moving said transparent surface for performing an electromagnetic operation thereon.

12. The image display of claim 1 wherein:
    said transparent surface constituting an insulating transparent layer.

13. The image display of claim 12 wherein:
    said transparent surface having a layer thickness ranging between five to five hundred microns (5–500 $\mu$m).

14. The image display of claim 12 wherein:
    said transparent surface comprising an abrasion resistant polymeric layer.

15. The image display of claim 1 wherein:
    each of said sealed microcups further comprising a second surface constituting a common electrode layer opposite said transparent surface.

16. The image display of claim 1 wherein:
    said particles contained in said sealed microcups comprising charged pigment particles visually contrast with said solvent.

17. The image display of claim 16 wherein:
    said pigment particles comprising a color dye.

18. The image display of claim 17 wherein:
    said color dye is a nonionic azo or anthraquinone dye.

19. The image display of claim 1 wherein:
    said solvent contained in said sealed microcups comprising a dielectric solvent.

20. The image display of claim 19 wherein:
    said dielectric solvent having a dielectric constant in the range of about 2 to about 30.

21. The image display of claim 1 wherein:
    said particles contained in said sealed microcups comprising charged organic particles.

22. The image display of claim 1 wherein:
    said particles contained in said sealed microcups comprising charged inorganic particles.

23. The image display of claim 1 wherein:
    said particles contained in said sealed microcups comprising positively charged particles.

24. The image display of claim 1 wherein:
    said particles contained in said sealed microcups comprising negatively charged particles.

25. The image display of claim 1 wherein:
    said erasing means is an electrical eraser head.

26. The image display of claim 1 wherein:
    said erasing means is disposed on a backside opposite said transparent surface.

27. The image display of claim 1 wherein:
    said erasing means is disposed on a viewing side on a same side as said transparent surface.

28. The image display of claim 1 wherein:

said image writing/drawing means is an electrical writing pen.

29. The image display of claim 28 wherein:

said electrical writing pen is disposed on a viewing side on a same side as said transparent surface.

30. The image display of claim 1 wherein:

said erasing means is an electrical eraser which functions as a manual eraser.

31. The image display of claim 30 wherein:

said electrical eraser is disposed on a viewing side on a same side as said transparent surface.

32. A method for configuring an image display comprising:

containing in an array of sealed microcups a plurality of particles of a designated electric, magnetic or both electric and magnetic characteristic suspended in a solvent wherein a surface of a plurality of said sealed microcups constituting a transparent surface;

applying an electric, magnetic or electromagnetic image writing/drawing means to said particles to' form an image viewable from said transparent surface; and applying an electric, magnetic or electromagnetic erasing means to said particles to erase said image.

33. The method claim 32 wherein:

said step of containing in an array of sealed microcups a plurality of particles is a step of containing electrically charged particles in said array of sealed microcups.

34. The method claim 32 wherein:

said step of containing in an array of sealed microcups a plurality of particles suspended in a solvent is a step of containing an electrophoretic dispersion in said array of sealed microcups.

35. The method of claim 32 further comprising:

using an image scanning means for scanning and recording said image.

36. The method of claim 32 further comprising:

employing a processor-controlled image writing means for receiving input data from an image data source for writing an image viewable from said transparent surface.

37. The method of claim 32 further comprising:

employing a neutralizing means for neutralizing an electromagnetic effect from said particles contained in said sealed microcups.

38. The method of claim 32 further comprising:

employing a surface moving means for moving said transparent surface for performing an electromagnetic operation thereon.

39. The method of claim 32 further comprising:

configuring in each of said sealed microcups a second surface opposite said transparent surface for providing on said second surface a common electrode layer.

\* \* \* \* \*